(12) United States Patent
Dufourd et al.

(10) Patent No.: US 8,782,689 B2
(45) Date of Patent: Jul. 15, 2014

(54) METHOD OF BROADCASTING CONTENT AND AT LEAST ONE COMPLEMENTARY ELEMENT, UTILIZING A SERVER AND A TERMINAL

(75) Inventors: Jean-Claude Dufourd, Le Kremlin Bicetre (FR); Cédric Gegout, Rennes (FR)

(73) Assignee: Streamezzo, Paris (FR)

( * ) Notice: Subject to any disclaimer, the term of this patent is extended or adjusted under 35 U.S.C. 154(b) by 899 days.

(21) Appl. No.: 12/664,602

(22) PCT Filed: Jun. 5, 2008

(86) PCT No.: PCT/EP2008/057043
§ 371 (c)(1),
(2), (4) Date: Feb. 25, 2010

(87) PCT Pub. No.: WO2008/155240
PCT Pub. Date: Dec. 24, 2008

(65) Prior Publication Data
US 2010/0175083 A1 Jul. 8, 2010

(30) Foreign Application Priority Data
Jun. 13, 2007 (FR) ...................... 07 55745

(51) Int. Cl.
*H04N 7/10* (2006.01)
*H04N 7/025* (2006.01)

(52) U.S. Cl.
USPC ................ 725/32; 725/33; 725/34; 725/35; 725/36

(58) Field of Classification Search
None
See application file for complete search history.

(56) References Cited

U.S. PATENT DOCUMENTS

| 5,805,763 | A  | * | 9/1998 | Lawler et al. | 386/296 |
| 6,389,168 | B2 | * | 5/2002 | Altunbasak et al. | 382/224 |
| 2002/0115047 | A1 | * | 8/2002 | McNitt et al. | 434/252 |
| 2004/0249650 | A1 | * | 12/2004 | Freedman et al. | 705/1 |
| 2005/0262539 | A1 | * | 11/2005 | Barton et al. | 725/90 |
| 2005/0271251 | A1 | * | 12/2005 | Russell et al. | 382/103 |
| 2009/0089064 | A1 | * | 4/2009 | Bachleda et al. | 704/275 |
| 2012/0180083 | A1 | * | 7/2012 | Marcus | 725/32 |

FOREIGN PATENT DOCUMENTS

WO 0122729 A1 3/2001
WO 2006114796 A1 11/2006

OTHER PUBLICATIONS

English translation of Preliminary Report on Patentability and Written Opinion for corresponding International Application No. PCT/EP2008/057043, filed Jun. 5, 2008.
French Search Report of Counterpart Application No. FR 07/55745 Filed on Jun. 13, 2007.
International Search Report of Counterpart Application No. PCT/EP2008/057043 filed on Jun. 5, 2008.

* cited by examiner

*Primary Examiner* — Pankaj Kumar
*Assistant Examiner* — Charles N Hicks
(74) *Attorney, Agent, or Firm* — Zilka-Kotab, PC

(57) ABSTRACT

A method and apparatus are provided for broadcasting at least one complementary element corresponding to a content broadcast to a terminal. The method includes: applying, to at least one portion of the content, at least one index detection function, stored in a database, the detection function delivering an information cue regarding the presence or absence of the index, providing at least one complementary element associated with the index, if a presence cue is emitted; and combining the content and the at least one complementary element, thereby delivering a complete content.

10 Claims, 2 Drawing Sheets

METHOD OF BROADCASTING CONTENT AND AT LEAST ONE COMPLEMENTARY ELEMENT, UTILIZING A SERVER AND A TERMINAL

CROSS-REFERENCE TO RELATED APPLICATIONS

This Application is a Section 371 National Stage Application of International Application No. PCT/EP2008/057043, filed Jun. 5, 2008 and published as WO 2008/155240 on Dec. 24, 2008, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of the broadcasting of contextual information elements from an indexed multi-media content publication platform.

To be more specific, the technical field of the disclosure relates to multimedia applications and the use of information about content usage in order to send a relevant additional content, or additional data, which will be included in the final presentation made to the user, the relevant additional content being dependent upon the content previously broadcast on the terminal of said user.

Aspects of disclosure may be used in a great number of multi-media applications and particularly those that require a representation of the constituent signals thereof in the form of a spatiotemporal arrangement of graphic objects, such as for example "RichMedia" applications on mobiles or "RichInternet" applications on the Web.

In particular, the disclosure applies to already known graphic scene description formats such as MPEG-4/BIFS (Binary Format Scene), MPEG-4/LASeR (Lightweight Application Scene Representation), SVG (Scalable Vector Graphics), SMIL (Synchronised Multimedia Integration Language), XHTML (eXtensible HyperText Markup Language), etc.

BACKGROUND OF THE DISCLOSURE

Among known prior art solutions, the main techniques for managing user-related information rely heavily on user profile data or temporal information. They suffer from a lack of straightforwardness in relation to referencing the additional data to be sent and require a complex information system infrastructure.

These techniques are more often than not based on the verification of a certain number of constraints in respect of the user profile data or on the sharing of temporal data between the different media sources presented to the user.

These current techniques are not suitable for multi-media environments, in which graphic information from a plurality of sources is aggregated and presented at the same time to the user. Quite often the techniques for indexing additional content take no account of the aggregation or the outcome (graphic or otherwise) restored to the user.

Other techniques are also proposed, on condition that the contents which are broadcast are previously indexed and documented by indices, markers or references. Such techniques associate with a content a marker, or markers, which will allow one of the elements in the publication and rendering string on the user display screen to identify the presence and the sending of a given complementary or additional content. These techniques are unsuitable for "live" contents where the content cannot be known in advance and therefore where no content can be marked or indexed in advance.

SUMMARY

These objectives, and others which will become clear subsequently, are met through the use of a method of broadcasting at least one complementary element corresponding to a content broadcast to a terminal, said content consisting of at least one elementary component.

According to an embodiment of the invention, said method comprises the following steps:
  applying, to at least one portion of said content, at least one contextual index detection function, stored in a database, said detection function implementing an analysis of at least one of said elementary components and delivering an information cue regarding the presence or absence of said contextual index;
  providing at least one complementary element associated with said contextual index, if a presence cue is emitted;
  combining said content and said complementary element or elements delivering a complete content.

An embodiment of the invention is thus based on a new and inventive approach to the insertion of complementary elements into a content, based on the detection of indices.

An inventive method implements index detection algorithms in order to determine whether one or more complementary elements are to be combined with the broadcast content, also known as start content.

Indeed, the insertion of complementary elements into a content is based on the presence of certain indices in the content, so as to be in harmony with the content being broadcast. Since these indices can be highly varied, they are detectable by detection functions that are also of varied natures and complexities.

These detection functions are stored in a database and applied to the content.

According to an embodiment of the invention, said detection functions implement at least one of the operations belonging to the group that includes:
  element comparison;
  voice recognition;
  musical imprint comparison;
  character recognition:
  image recognition;
  visual scene recognition.
  The detection functions implemented by an inventive method may thus be numerous, to allow detection of different types of index.
  For example, an index detection function, considered as quite straightforward, may comprise comparing a plurality of elements, in other words detecting whether an element defined in the detection function is present in the content.

According to an embodiment of the invention, said elements belong to the group that includes:
  an elementary component of said content;
  a composition of a plurality of elementary components of said content;

a succession of a plurality of elementary components or compositions of a plurality of elementary components of said content.

A detection function is thus able to detect for example whether a particular geometric shape, or particular texture, or particular colour is present in the content.

A detection function is also able to detect whether a particular geometric shape and a particular colour is present.

More complex index detection functions may be implemented by the method, such as voice recognition, possibly speaker independent (multi-speaker), or image or character recognition.

A detection function is also able to comprise visual scene recognition.

Other detection function examples may of course be implemented in the inventive method.

Moreover, said detection functions take into account at least one predetermined detection criterion belonging to the group that includes:
 physical characteristics of said terminal;
 subscription conditions of said terminal;
 information on localisation of said terminal;
 characteristics of a user of said terminal.
 Applying detection functions thus takes some terminal characteristics into account, thereby optimising detection.

For example, if a terminal does not have sufficient capacity to display some content features, a detection function based on these features will not be applied to the content.

In another example, the application of a particular detection function may take into account the localisation of the terminal, for example whether the complementary element to be inserted is linked to a particular localisation (advertising message for a local event for example).

The application of detection functions may also take into account the user of the terminal, who is pre-identified, so as to take into consideration a particular user-related profile.

According to one inventive embodiment said step of applying at least one detection function is implemented in said terminal.

According to an alternative to this embodiment, said at least one detection function is applied to the part of the content rendered on said terminal corresponding to said broadcast content.

The detection functions can thus be implemented directly in the terminal on which the content is rendered.

In this way, the detection functions may be applied either to the broadcast content, intended to be rendered on the terminal, or to only one part of the broadcast content, said part being able for example to be the part which is rendered on the terminal.

According to another inventive embodiment, said step of applying at least one detection function is implemented in a broadcasting system component belonging to the group that includes:
 a multiplexer;
 a broadcasting server;
 a services server.

Thus, since a broadcasting system including the terminal on which the content is rendered, is also able to include other components, such as for example a multiplexer and/or a broadcasting server and/or a services server, the detection functions are therefore also able to be implemented in one of these broadcasting system components, and no longer in the terminal.

According to another particular aspect of an embodiment of the invention, said complementary element is of a type belonging to the group that includes:
 a RichMedia type;
 an interactive type;
 a spatiotemporal type.

A complementary element is thus able to correspond to a multi-media element or RichMedia type represented in space and time, on the terminal screen or the other input-output modules of the terminal such as the loudspeaker, the keys etc. A complementary element is also able to be interactive, in other words bring about interactions with the user once combined with the start content. A complementary element is also able to be a pointer to a "url" Web address.

According to one inventive embodiment, said step of providing said complementary element includes a step of transmitting said complementary element from a server including said database to said terminal and in that said combination of said content and said complementary element is implemented dynamically in said terminal.

Once one or more indices are detected, the complementary element or elements corresponding to these indices can be combined with the broadcast content.

These complementary elements may come from a server including the database in which the detection functions are stored and can be transmitted to the terminal, in order to be combined, in the terminal, with broadcast content.

According to another inventive embodiment, said step of providing said complementary element includes a step of transmitting said complementary element from a server including said database to said terminal through a multiplexer or a broadcasting server.

The complementary elements can thus be transmitted from a server to the terminal through another broadcasting system component, for example a multiplexer or a broadcasting server.

In this case, said combination of said content and said complementary element is implemented in a broadcasting system component belonging to the group that includes:
 a multiplexer;
 a broadcasting server;
 a services server.

The complementary elements are thus not transmitted directly to the terminal, so as to be combined therein with the start content, but are combined with the content in one of the system components, such as a multiplexer, a broadcasting server or a services server. The combination of complementary elements and start content, known as complete content, is then broadcast to the terminal.

An embodiment of the invention also relates to a server including a database storing at least one detection function.

In said server, each of said detection functions is associated with at least one complementary element.

Moreover, said server includes means for providing at least one complementary element associated with at least one of said positive response detection functions.

According to an embodiment of the invention, said server also includes means for applying, to a content broadcast to a terminal, at least one of said detection functions stored in said database.

Said server is thus capable of implementing one or more detection functions on the start content, and of providing one or more complementary elements corresponding to these functions.

Moreover, according to an embodiment of the invention, said server further includes means for combining said content and at least one complementary element.

Said server is thus also capable of effecting a combination between a complementary element and a start content.

Lastly, an embodiment of the invention also relates to a terminal capable of receiving and rendering multimedia contents, consisting of at least one elementary component.

According to an embodiment of the invention, said terminal includes means for applying, to a content intended to be rendered on said terminal, at least one contextual index detection function, stored in a database, said detection function implementing an analysis of at least one of said elementary components and delivering an information cue regarding the presence or absence of said contextual index.

Said terminal is thus capable of implementing one or more index detection functions, thereby making it possible to determine whether one or more complementary elements are to be inserted into the start content.

BRIEF DESCRIPTION OF THE DRAWINGS

Other characteristics and advantages will become clearer from reading the following description of one particular embodiment given simply by way of information and non-restrictively, and from the appended drawings, wherein.

DETAILED DESCRIPTION OF ILLUSTRATIVE EMBODIMENTS

1. General Principle

An example of an inventive principle lies in the detection, in a broadcast content, of indices indicating that one or more additional contents are to be proposed to the content user.

The indices to be detected are referenced, in the form of detection functions, in a database on a server, and are associated with one or more additional contents.

The detection of these indices therefore comprises applying to the broadcast content, or a part of said content, one or more detection functions stored in the database.

When a detection function returns a positive response, the complementary element which is associated with it in the database is provided to the terminal, directly or through other elements of the broadcasting system in which the inventive method is implemented, with a view to combining it with the broadcast content.

Figure 1:
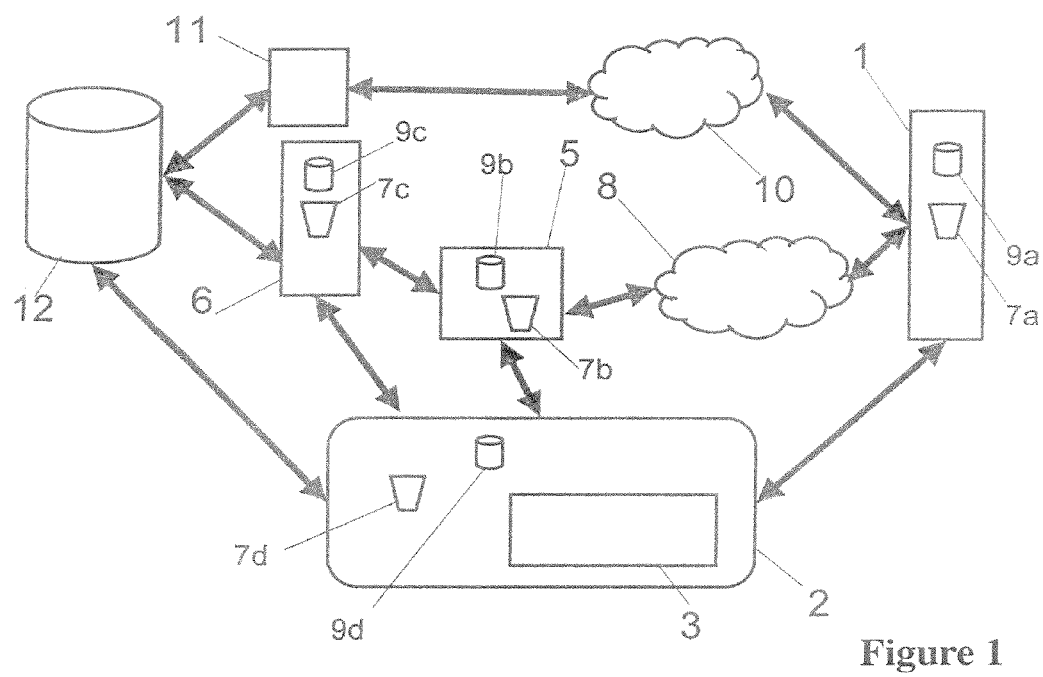
FIG. 1 shows an example of a system wherein an inventive method is implemented.

Firstly, in relation to FIG. 1, an example of a broadcasting system has been shown wherein the inventive broadcasting method is implemented.

In this example, the broadcasting system includes a plurality of servers 2, 6, 11, 12, a multiplexer, two networks 8, 10, and a terminal 1, to which the content is broadcast.

The server 2 contains in particular the database 3 including the detection functions associated with the complementary elements to be broadcast.

The server 12 is a multimedia audiovisual content server, connected to the server 2, to the distribution server 11 and to the broadcasting server 6.

The server 11 is itself connected to the terminal 1 by the distribution network 10.

The server 6 is connected to a multiplexer 5, itself connected to the terminal 1 by the telecommunications network 8.

The terminal 1 is also connected to the server 2.

The terminal 1 and the servers 5, 6, 2 may contain a combination module denoted 7a, 7b, 7c, 7d respectively capable of effecting the combination of one or more complementary elements with the content, and a reference value denoted 9a, 9b, 9c and 9d respectively, used by some detection functions as described below.

2. Description of One Embodiment

Figure 2:
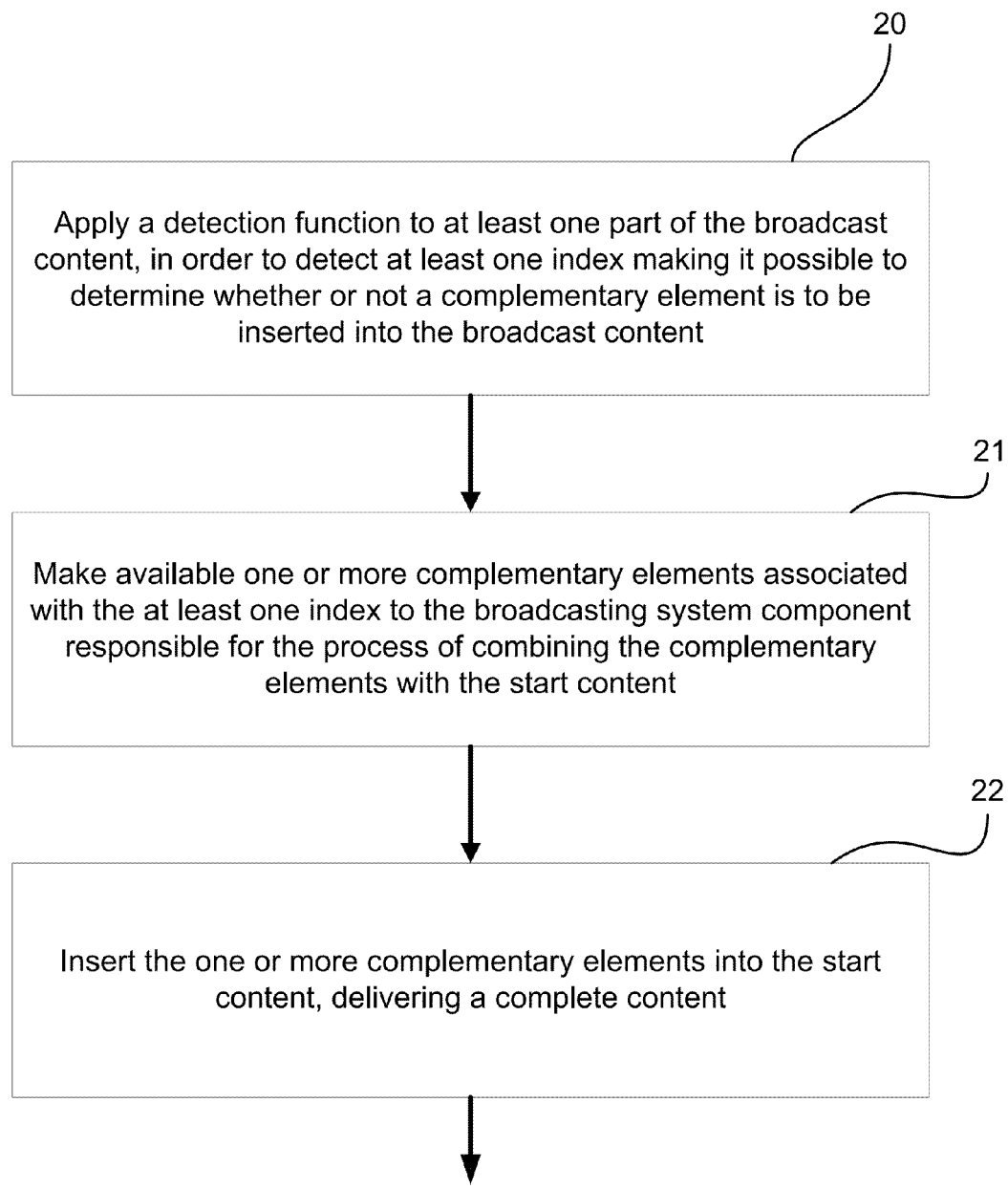
FIG. 2 shows the main steps in an inventive broadcasting method.

An embodiment of an inventive broadcasting method is now given, as implemented in a broadcasting system as previously described, in relation to FIG. 2.

The different steps described below relate to the implementation of a detection function, and may be repeated, simultaneously or successively, for one and the same content, according to predetermined criteria.

Indeed, the method may apply by default a certain number of detection functions, successively, whatever the result thereof, and a plurality of different complementary elements may therefore be inserted into one and the same content, if a plurality of indexes are detected.

Or, different detection functions may be applied successively, in the event of a failure of the previous one, and the method stops implementing detection functions as soon as the first index is detected.

The first step 20 therefore comprises applying a detection function to at least one part of the broadcast content, in order to detect at least one index making it possible to determine whether or not a complementary element is to be inserted into the broadcast content.

The index detection function or functions are stored in a database, on a server, and are applied to the content, or a part of the content, as a function of predetermined detection criteria.

These criteria make it possible for example to determine whether the functions apply to the broadcast content in its entirety, or only to a part of the content, for example that rendered on the terminal at the time the detection is implemented.

Moreover, in a particular embodiment alternative, the detection functions may be applied, during the broadcasting of the content, to a part of the content which will be broadcast subsequently. This alternative makes it possible to anticipate index detection and the transmission of complementary elements to be inserted into the content.

Once an index has been detected, one or more complementary elements associated with this index are made available at the next step 21 of providing this (or these) complementary element(s).

At this step, the complementary element or elements associated with the detected index are therefore made available to the broadcasting system component (as described previously in relation to FIG. 1) which will be responsible for the process of combining these complementary elements with the start content.

At a last combination step 22, the complementary elements provided are therefore inserted into the start content, delivering a complete content.

This last step may therefore be implemented in the terminal, or in one of the other components of the broadcasting system, such as a multiplexer, a broadcasting server or a services server.

2.1 Detection Function Examples

A few, more or less complex, detection function examples are described below, as implemented by an inventive broadcasting method.

A first detection function example comprises detecting, in the content, the presence of an element, known as a primitive element or elementary component, such as for example an image or a sound, identical or similar to a reference primitive element, associated with the detection function under consideration.

Said detection function implements a comparison of the primitive elements of the content with the reference primitive element and delivers a positive or negative comparison result.

The comparison may comprise a calculation of the distance between a reference primitive element and a primitive element detected and presumed similar to the reference primitive element. If the distance between these two elements is below a predetermined threshold, also known as a reference value (7a to 7d in FIG. 1), then the detection function delivers a positive result, otherwise it delivers a negative result.

In the event of a positive result, the complementary element associated with the detection function is provided for the purpose of combining it with the content.

Another more complex detection function example comprises effecting a speaker independent (multi-speaker) voice recognition. This detection function is not a straightforward comparison of two sounds, but a comparison of two utterances by different voices.

In this case, the detection function corresponds to a voice recognition algorithm, applied to the content, delivering a positive response in the event of successful recognition of a key phrase utterance and negative in the contrary event.

Another example of a detection function used in the inventive broadcasting method comprises effecting a comparison of musical imprints. Here too, the detection function is not a straightforward comparison between two sounds, but corresponds to a method which extracts a predetermined number of parameters from the content and compares them with the reference parameters associated with the detection function, in order to render the comparison independent of the effects related for example to the encoding, or to the sound montage, in the content.

Another detection function used in the inventive broadcasting method comprises effecting a character recognition, so as to recognise text "buried" in an image for example.

In this case, the detection function implements a character recognition algorithm applied to a visual content, delivering a positive response in the event of successful recognition of a particular character string and negative in the contrary event.

A detection function may also comprise detecting a complex element known as a "sensory outcome". A sensory outcome may result from the audiovisual composition of primitive elements (images, graphic animation, sounds) and/or from processes conducted on these primitive elements (such as filtering, colour reduction, symmetry, etc). A sensory outcome is for example a change of screen background colour, a change of character font etc., and corresponds to a complex graphic element presented to the user.

The inventive broadcasting method may apply these different detection functions types successively, whatever the respective results thereof, if it is wished to complete the content with as many complementary elements as possible, or to interrupt the application of the detection functions as soon as the first positive result is obtained, so as to broadcast only one complementary element.

Whatever the detection function implemented in the inventive broadcasting method, it may be applied to the whole content or only to one part of said content, for example a specific part of the screen in the case of image detection. This distinction is indicated in the detection function itself.

Another possible alternative comprises applying the detection functions to the part of the content broadcast during rendering: this applies to complex contents that have a plurality of sub-parts which are not rendered at the same time.

The advantage of this alternative is that it renders the complementary element or elements only on rendering of the broadcast content part which contains the detection source.

2.2 Complementary Element Examples

A complementary element may be of the RichMedia type, such as sound, video, animated vector graphics, user interactions etc.

It may also be a pointer to a url web address.

In particular, a complementary element is of the spatiotemporal type, in other words it corresponds to a multimedia element, or RichMedia type, represented in space and time on the screen and the other input-output modules (loud speaker, ringer, keys, etc) of the terminal on which the broadcast content is rendered.

An embodiment of the invention proposes a technique suitable for multi-media environments.

An embodiment provides a technique for broadcasting additional contents which is straightforward to implement and inexpensive in terms of referencing these additional contents.

An embodiment of the invention allows the implementation of said technique in the case of live contents.

Although the present disclosure has been described with reference to one or more examples, workers skilled in the art will recognize that changes may be made in form and detail without departing from the scope of the disclosure and/or the appended or issued claims thereof.

The invention claimed is:

1. A method, comprising:
   applying, to at least one portion of content, a plurality of contextual index detection functions, said contextual index detection functions each:
      implementing an analysis of only a portion of the content that will be broadcast and has not yet been broadcast, and
      delivering an information cue regarding the presence or absence of a contextual index within the content,
      where the presence of the contextual index indicates that additional content is to be included with the content;
   providing at least one complementary element associated with each contextual index, if each associated information cue indicates the presence of the contextual index; and
   combining said content and said at least one complementary element for broadcasting thereof;
   where one of the plurality of contextual index detection functions detects whether a primitive element at least similar to a reference primitive element associated with the one of the plurality of contextual index detection functions is present in the content, calculates a difference between the at least similar primitive element, when present, and the reference primitive element, and delivers a presence cue indicating the presence of an associated contextual index if the difference is below a predetermined threshold.

2. The method as claimed in claim 1, wherein at least one contextual index detection function accounts for one or more of physical characteristics of a terminal, subscription conditions of said terminal, information on localization of said terminal, and characteristics of a user of said terminal.

3. The method as claimed in claim 1, wherein applying the plurality of contextual index detection functions is implemented in a terminal.

4. The method as claimed in claim 1, wherein applying the plurality of contextual index detection functions is implemented by a a multiplexer, a broadcasting server, or a services server.

5. The method as claimed in claim 1, wherein said at least one complementary element includes a RichMedia type element, an interactive type, element or a spatiotemporal type element.

6. The method as claimed in claim 1, wherein providing the at least one complementary element includes transmitting said at least one complementary element from a server including a database to a terminal, where said combination of said content and said at least one complementary element is implemented dynamically in said terminal.

7. The method as claimed in claim 1, wherein providing the at least one complementary element includes transmitting said at least one complementary element from a server including a database to a terminal through a multiplexer or a broadcasting server.

8. The method as claimed in claim 7, wherein combining said content and said at least one complementary element is implemented by the multiplexer, the broadcasting server, or a services server.

9. A system, including:
   a server for:
      applying, to at least one portion of content, a plurality of contextual index detection functions, said contextual index detection functions each:
      implementing an analysis of only a portion of the content that will be broadcast and has not yet been broadcast, and delivering an information cue regarding the presence or absence of a contextual index within the content, where the presence of the contextual index indicates that additional content is to be included with the content;

providing at least one complementary element associated with each contextual index, if each associated information cue indicates the presence of the contextual index; and combining said content and said at least one complementary element for broadcasting thereof;

where one of the plurality of contextual index detection functions detects whether a primitive element at least similar to a reference primitive element associated with the one of the plurality of contextual index detection functions is present in the content, calculates a difference between the at least similar primitive element, when present, and the reference primitive element, and delivers a presence cue indicating the presence of an associated contextual index if the difference is below a predetermined threshold.

10. The method as claimed in claim 1, wherein the primitive element includes one or more of a sound, an image, and a texture.

\* \* \* \* \*

UNITED STATES PATENT AND TRADEMARK OFFICE
CERTIFICATE OF CORRECTION

PATENT NO. : 8,782,689 B2
APPLICATION NO. : 12/664602
DATED : July 15, 2014
INVENTOR(S) : Jean-Claude Dufourd et al.

Page 1 of 1

It is certified that error appears in the above-identified patent and that said Letters Patent is hereby corrected as shown below:

In the Claims:
At column 8, claim number 4, line number 66; please replace "by a a multiplexer" with --by a multiplexer--.

Signed and Sealed this
Fifteenth Day of March, 2016

Michelle K. Lee
*Director of the United States Patent and Trademark Office*